United States Patent
Kitahara et al.

(10) Patent No.: US 10,735,787 B2
(45) Date of Patent: Aug. 4, 2020

(54) TRANSMISSION DEVICE, TRANSMISSION METHOD, RECEPTION DEVICE, RECEPTION METHOD, AND COMPUTER PROGRAM

(71) Applicant: Saturn Licensing LLC, New York, NY (US)

(72) Inventors: Jun Kitahara, Shizuoka (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/023,723

(22) PCT Filed: Jun. 23, 2014

(86) PCT No.: PCT/JP2014/066594
§ 371 (c)(1),
(2) Date: Mar. 22, 2016

(87) PCT Pub. No.: WO2015/049900
PCT Pub. Date: Apr. 9, 2015

(65) Prior Publication Data
US 2016/0234534 A1    Aug. 11, 2016

(30) Foreign Application Priority Data
Oct. 2, 2013 (JP) .................. 2013-207711

(51) Int. Cl.
*G06F 3/00* (2006.01)
*G06F 13/00* (2006.01)
(Continued)

(52) U.S. Cl.
CPC ........ *H04N 21/2362* (2013.01); *H04H 20/95* (2013.01); *H04H 60/37* (2013.01);
(Continued)

(58) Field of Classification Search
CPC combination set(s) only.
See application file for complete search history.

(56) References Cited

U.S. PATENT DOCUMENTS 7,733,819 B2 *  6/2010  Lee .................. H04H 20/26
                                                370/312
2007/0237184 A1  10/2007  Park et al.
(Continued)

FOREIGN PATENT DOCUMENTS

JP    2008-522487 A    6/2008
JP    2010-62977 A     3/2010
(Continued)

OTHER PUBLICATIONS

International Search Report dated Sep. 16, 2014 in PCT/JP2014/066594 (with English language translation).
(Continued)

*Primary Examiner* — Mulugeta Mengesha
(74) *Attorney, Agent, or Firm* — Oblon, McClelland, Maier & Neustadt, L.L.P.

(57) ABSTRACT

Reception processing of broadcast content, in transmission of which an IP system is employed, is performed. An SDPT, in a header extension part of which service identification information and an SDP are arranged, in an SSC is transmitted from a broadcasting station. On a reception side, it becomes possible to acquire an intended SDPT from signaling information SSC easily at high speed by performing section filtering processing with respect to a received transport stream. Then, it is possible to access a stream of an intended channel at high speed based on an IP address and a port number described in an SDP stored in a header extension part of the acquired SDPT.

16 Claims, 16 Drawing Sheets

(51) Int. Cl.
| | |
|---|---|
| *H04N 5/445* | (2011.01) |
| *H04N 21/2362* | (2011.01) |
| *H04N 21/434* | (2011.01) |
| *H04N 21/643* | (2011.01) |
| *H04H 60/72* | (2008.01) |
| *H04H 60/37* | (2008.01) |
| *H04H 20/95* | (2008.01) |
| *H04N 21/61* | (2011.01) |
| *H04N 21/235* | (2011.01) |
| *H04N 21/414* | (2011.01) |
| *H04N 21/8543* | (2011.01) |
| *H04N 21/482* | (2011.01) |

(52) U.S. Cl.
CPC ........ *H04H 60/72* (2013.01); *H04N 21/2356* (2013.01); *H04N 21/41407* (2013.01); *H04N 21/4345* (2013.01); *H04N 21/6112* (2013.01); *H04N 21/64322* (2013.01); *H04N 21/8543* (2013.01); *H04N 21/4821* (2013.01)

(56) References Cited

U.S. PATENT DOCUMENTS

| | | | |
|---|---|---|---|
| 2007/0266122 A1 | 11/2007 | Einarsson et al. | |
| 2008/0199021 A1* | 8/2008 | Park | H04L 29/06027 381/81 |
| 2009/0052580 A1 | 2/2009 | Song et al. | |
| 2009/0064218 A1 | 3/2009 | Yamagishi | |
| 2009/0178082 A1* | 7/2009 | Zhang | H04H 20/38 725/51 |
| 2009/0316831 A1* | 12/2009 | Song | H04L 27/02 375/301 |
| 2009/0320087 A1 | 12/2009 | Song et al. | |
| 2010/0130122 A1 | 5/2010 | Sridhar et al. | |
| 2010/0226366 A1* | 9/2010 | Lee | H04L 65/607 370/389 |
| 2011/0110318 A1* | 5/2011 | Park | H04H 20/28 370/329 |
| 2012/0054214 A1 | 3/2012 | Yamagishi et al. | |
| 2013/0013780 A1 | 1/2013 | Yamagishi | |
| 2013/0219431 A1* | 8/2013 | Hong | H04H 20/42 725/54 |
| 2013/0291046 A1* | 10/2013 | Ko | H03M 13/251 725/116 |
| 2014/0109160 A1 | 4/2014 | Suh et al. | |
| 2015/0350719 A1* | 12/2015 | Kim | H04N 21/2362 725/32 |

FOREIGN PATENT DOCUMENTS

| | | |
|---|---|---|
| JP | 2010-529734 A | 8/2010 |
| JP | 2012-99960 A | 5/2012 |
| JP | 2012-217190 A | 11/2012 |
| KR | 10-0819259 | 4/2008 |
| KR | 10-0878534 | 1/2009 |
| WO | WO 2012/029569 A1 | 3/2012 |

OTHER PUBLICATIONS

Extended European Search Report dated Mar. 20, 2017 in Patent Application No. 14851352.6.

Office Action dated Apr. 6, 2017 in European Patent Application No. 14851352.6.

Sam Dutton, "Getting Started with WebRTC", HTML5 Rocks, http://www.html5rocks.com/en/tutorials/webrtc/basics/, XP55103693, Feb. 21, 2014, 31 pages.

J. Uberti et al., "Javascript Session Establishment Protocol; draft-ietf-rtcweb-jsep-03", Internet Engineering Task Force, XP015092086, Feb. 2013, pp. 1-32.

"Floor control mechanism for Web Real-Time Communication (WebRTC) based conferences", Research Disclosure, XP007141488, Aug. 2012, 13 pages.

* cited by examiner

*FIG. 2*

| | | ESG 251 | NRT 252 | V/A/CC 253 |
|---|---|---|---|---|
| | SSC 241 | FLUTE 242 | | RTP/RTCP 243 |
| | UDP LAYER 231 | | | |
| | IP LAYER 221 | | | |
| SIGNALING 211 | DATA LINK LAYER 212 | | | |
| PHYSICAL LAYER 201 | | | | |

*FIG. 5*

| NID | TSID | ServiceID | PHYSICAL INFORMATION |
|---|---|---|---|
| 0 | 0 | 9.1 | AAA |
| 1 | 0 | 10.1 | BBB |
| 1 | 0 | 10.2 | CCC |
| 2 | 0 | 11.1 | DDD |
| 2 | 1 | 11.2 | DDD |

FIG. 7

| Syntax | No. Bits | Format |
|---|---|---|
| bootstrap_descriptor(){ | | |
|     descriptor_tag | 8 | uimsbf |
|     descriptor_length | 8 | uimsbf |
|     reserved | 7 | bslbf |
|     service_id | 16 | uimsbf |
|     IP_version_flag | 1 | bslbf |
|     source_IP_address | 32 or 128 | uimsbf |
|     destination_IP_address | 32 or 128 | uimsbf |
|     destination_port_num | 16 | uimsbf |
|     TSI | 16 | uimsbf |
| } | | |

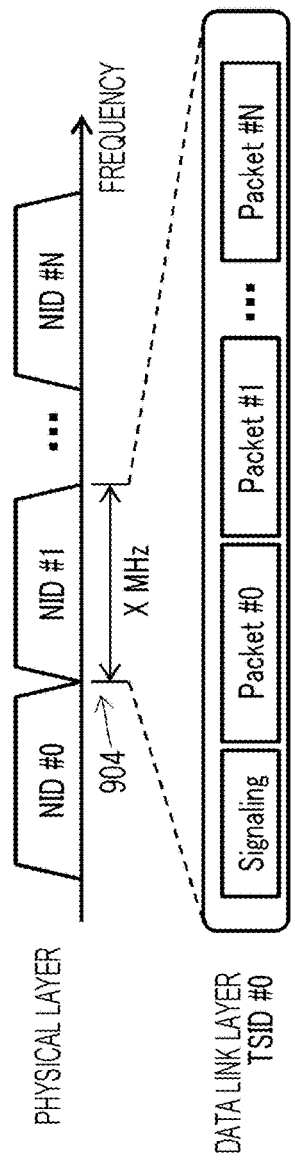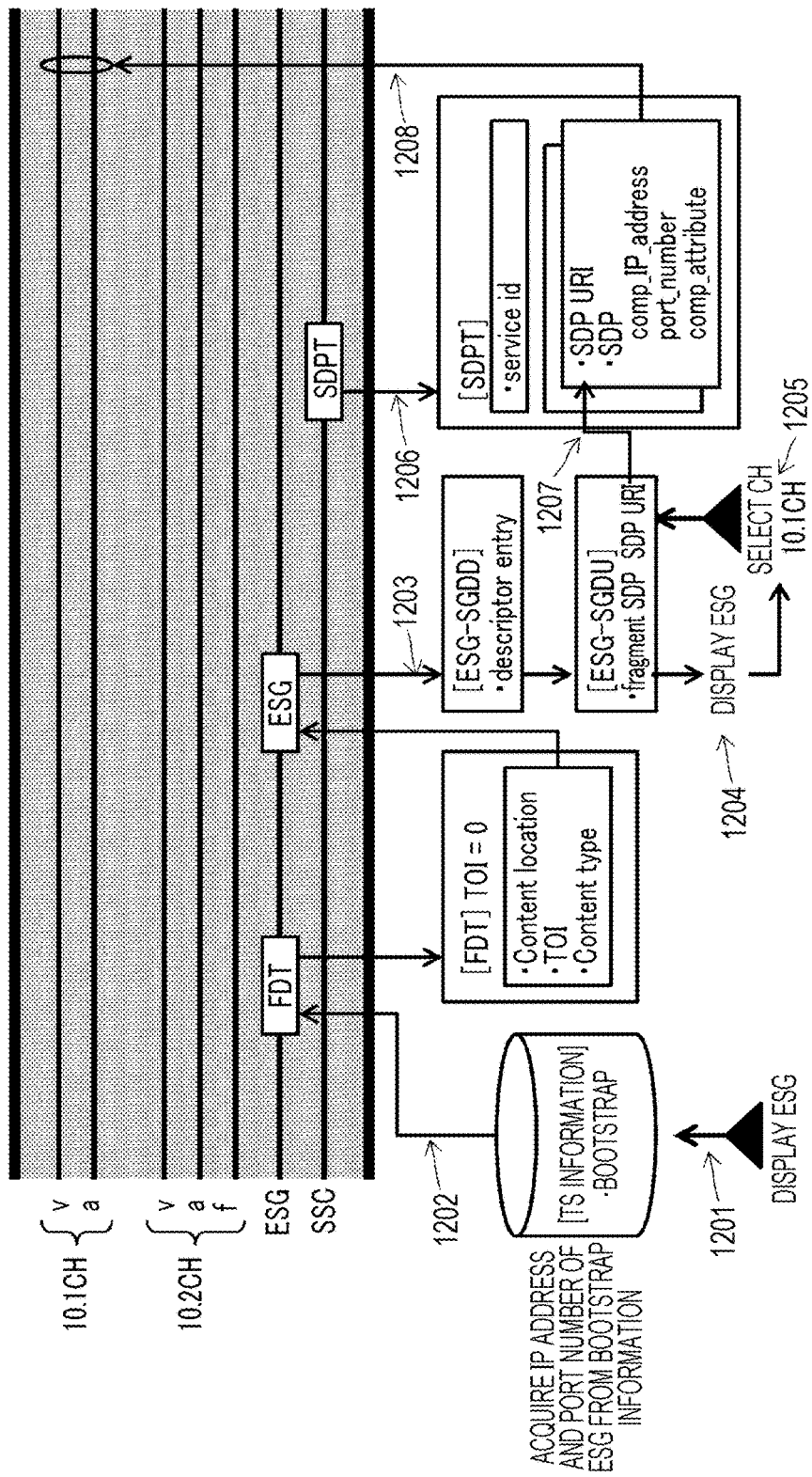
FIG. 12

FIG. 15

| Syntax | No. Bits | Format |
|---|---|---|
| service_description_protocol_table(){ | | |
|     table_id | 8 | uimsbf |
|     section_syntax_indicator | 1 | bslbf |
|     private_indicator | 2 | bslbf |
|     section_length | 12 | uimsbf |
|     table_id_extension{ | | |
|         service_id | 16 | uimsbf |
|     } | | |
|     reserved | 2 | bslbf |
|     version_number | 5 | bslbf |
|     current_next_indicator | 1 | bslbf |
|     section_number | 8 | uimsbf |
|     last_section_number | 8 | uimsbf |
|     sdpt_version | 8 | uimsbf |
|     sdpt_uri_length | 12 | uimsbf |
|     for(i=0;i<sdpt_uri_length;i++){ | | |
|         sdpt_uri_byte(); | var | var |
|     } | | |
|     sdp_length | 12 | uimsbf |
|     for(i=0;i<sdp_length;i++){ | 5 | bslbf |
|         sdp_byte(); | var | var |
|     } | | |
|     CRC_32 | 32 | rpchof |
| } | | |

FIG. 16

- v=0
- o=user123 2890844526 2890842807 IN IP6 2201:056D::112E:144A:1E24
- s=File delivery session example
- i=More information
- t=2873397496 2873404696
- a=mode:broadcast 1238691083029291
- a=FEC-declaration:0 encoding-id=1
- a=source-filter: incl IN IP6 * 2001:210:1:2:240:96FF:FE25:8EC9
- a=flute-tsi:3
- m=application 12345 FLUTE/UDP 0
- c=IN IP6 FF1E:03AD::7F2E:172A:1E24/1
- b=64
- a=lang:EN
- a=FEC:0

TRANSMISSION DEVICE, TRANSMISSION METHOD, RECEPTION DEVICE, RECEPTION METHOD, AND COMPUTER PROGRAM

TECHNICAL FIELD

A technology disclosed in the present description relates to a transmission device and a transmission method of employing an IP system as a transport layer and transmitting broadcast content, a reception device and a reception method of receiving broadcast content transmitted with the IP system as the transport layer, and a computer program.

BACKGROUND ART

As a terrestrial digital television broadcasting standard, there are digital video broadcasting (DVB) developed in the Europe, an advanced television systems committee (ATSC) developed in the US, integrated services digital broadcasting (ISDB) developed in Japan, and the like.

Many of current digital television broadcasting standards employ a moving picture experts group (MPEG) 2-transport stream (TS) as a transport layer. Recently, it is considered to change the MPEG2-TS system to an Internet protocol (IP) system for integration of broadcasting and communication, improvement of transmission efficiency, and the like.

For example, with respect to an advanced digital satellite broadcasting system, the following broadcasting packet generating device has been proposed. In a case of dividing a file, which is distributed through a broadcast transmission line, into a data unit of a predetermined size and of transmitting the data unit as a broadcasting IP packet, the broadcasting packet generating device divides the file into a data unit of a predetermined size, which is larger than a size of data stored in a data part of a complementary IP packet transmitted by a data complementary server through a communication line to complement the data unit in the file and which is the size multiplied by a predetermined integer value, converts the file into a packet, and generates a broadcasting IP packet including, in a header part, a download header to specify the data unit (see, for example, Patent Document 1).

Also, a transmission system to synchronize a clock of a decoder in a reception device with a clock of an encoder in a transmission device in a case of coding a video signal or the like, storing the coded signal into an IP packet, and transmitting the IP packet has been proposed (see, for example, Patent Document 2).

SUMMARY OF THE INVENTION

Problems to be Solved by the Invention

A technology disclosed in the present description is to provide a superior transmission device and transmission method which employ an IP system as a transport layer and which can transmit broadcast content suitably, a superior reception device and reception method which can suitably perform reception processing of broadcast content transmitted with the IP system as the transport layer, and a computer program.

Solutions to Problems

The present application is provided in view of the forgoing. A technology described in claim 1 is a transmission device applying an internet protocol (IP) system to a transport layer and transmitting a broadcast signal in which a table (SDPT) of a service description protocol (SDP) is arranged in a service signaling channel (SSC) transmitted in a transport stream.

According to a technology described in claim 2 of the present application, the transmission device according to claim 1 is configured to write the SDPT in a section form and to arrange service identification information and the SDP in a header extension part thereof.

According to a technology described in claim 3 of the present application, the transmission device according to claim 1 is configured to include, in the SDP arranged in the SDPT, an IP address, a port number, and attribute information of each component of a broadcasting channel corresponding to service identification information.

According to a technology described in claim 4 of the present application, the transmission device according to claim 1 is configured to transmit a display form of a program guide or program information of a broadcast by using an electronic service guide (ESG).

According to a technology described in claim 5 of the present application, the transmission device according to claim 4 is configured to describe an URI of the SDP in the ESG and is also configured to describe the URI of the SDP in the SDPT transmitted as the SSC.

According to a technology described in claim 6 of the present application, the transmission device according to claim 1 is configured to describe a bootstrap of the ESG in signaling acquired on a reception side during initial scanning.

Also, a technology described in claim 7 of the present application is a transmission method including: applying an IP system to a transport layer; and transmitting a broadcast signal in which an SDPT is arranged in an SSC transmitted in a transport stream.

Also, a technology described in claim 8 of the present application is a reception device configured to receive a broadcast signal in which an IP system is applied to a transport layer, the device including: a control signal processing unit configured to process a control signal included in the broadcast signal; and a stream processing unit configured to process a stream of each component of a broadcast program, wherein the control signal processing unit performs section filtering processing with respect to a received transport stream and acquires an intended SDPT from an SSC, and the stream processing unit processes a stream of an intended channel based on an IP address and a port number described in an SDP stored in a header extension part of the acquired SDPT.

According to a technology described in claim 9 of the present application, the reception device according to claim 8 further includes a low layer control signal processing unit configured to perform processing of a low layer of the broadcast signal, and a recording unit configured to record data. Then, the low layer control signal processing unit is configured to perform initial scanning, to acquire signaling including a bootstrap of the ESG, and to record the signaling into the recording unit.

According to a technology described in claim 10 of the present application, the reception device according to claim 9 further includes an ESG processing unit configured to process the ESG. Then, in a case of performing a display of the ESG, the control signal processing unit is configured to acquire a bootstrap of the ESG from the signaling recorded in the recording unit, and the ESG processing unit is configured to acquire a file of the ESG based on the bootstrap.

According to a technology described in claim 11 of the present application, the control signal processing unit of the reception device according to claim 10 is configured to specify, in a case of referring to the SDP in the ESG, a corresponding SDPT from the SSC based on an URI of the SDP described in the ESG and to acquire the SDP from the SDPT.

Also, a technology described in claim 12 of the present application is a reception method of receiving a broadcast signal in which an IP system is applied to a transport layer, the reception method including the steps of: performing section filtering processing with respect to a received transport stream and acquiring an intended SDPT from an SSC; and processing a stream of an intended channel based on an IP address and a port number described in an SDP stored in a header extension part of the acquired SDPT, the processing being performed by a stream processing unit.

Also, a technology described in claim 13 of the present application is a computer program described in a computer-readable form in such a manner that a computer is made to function as a reception device to receive a broadcast signal in which an IP system is applied to a transport layer, the computer program causing the computer to function as a control signal processing unit configured to process a control signal included in the broadcast signal and a stream processing unit configured to process a stream of each component of a broadcast program, wherein the control signal processing unit performs section filtering processing with respect to a received transport stream and acquires an intended SDPT from an SSC, and the stream processing unit processes a stream of an intended channel based on an IP address and a port number described in an SDP stored in a header extension part of the acquired SDPT.

The computer program according to claim 13 of the present application is defined to be a computer program described in a computer-readable form in such a manner that predetermined processing is realized on the computer. In other words, by installation of the computer program according to claim 13 of the present application into the computer, a cooperative action is exerted on the computer and it is possible to acquire an effect similar to that of the reception device according to claim 8 of the present application.

Effects of the Invention

According to a technology disclosed in the present description, a superior transmission device and transmission method which employ an IP system as a transport layer and which can transmit broadcast content suitably, a superior reception device and reception method which can suitably perform reception processing of broadcast content transmitted with the IP system as the transport layer, and a computer program can be provided.

Note that the effect disclosed in the present description is just an example and an effect of the present invention is not limited to this. Also, the present invention may have an additional effect other than the above-described effect.

A different purpose, characteristic, and advantage of the technology disclosed in the present description will be made clear with a detailed description based on an embodiment described later or on attached drawings.

BRIEF DESCRIPTION OF DRAWINGS

FIG. 2 is a view illustrating an example of a protocol stack applied to transmission of a broadcast signal in the digital broadcasting system 1 illustrated in FIG. 1.

FIG. 5 is a view illustrating an image of network information, transport stream information, and channel information being recorded in an NVRAM 313.

FIG. 7 is a view illustrating a syntactic structure of a descriptor of a bootstrap of an ESG stored in signaling 211.

FIG. 9 is a view illustrating a mechanism of direct channel-selection performed according to channel-selection operation with a remote controller or the like.

FIG. 12 is a view illustrating a mechanism of channel-selection from the ESG in the reception device 300.

FIG. 15 is a view illustrating an example of syntax of the SDPT.

FIG. 16 is a view illustrating an example of an SDP.

MODE FOR CARRYING OUT THE INVENTION

In the following, an embodiment of a technology disclosed in the present description will be described in detail with reference to the drawings.

A. System Configuration

Figure 1:
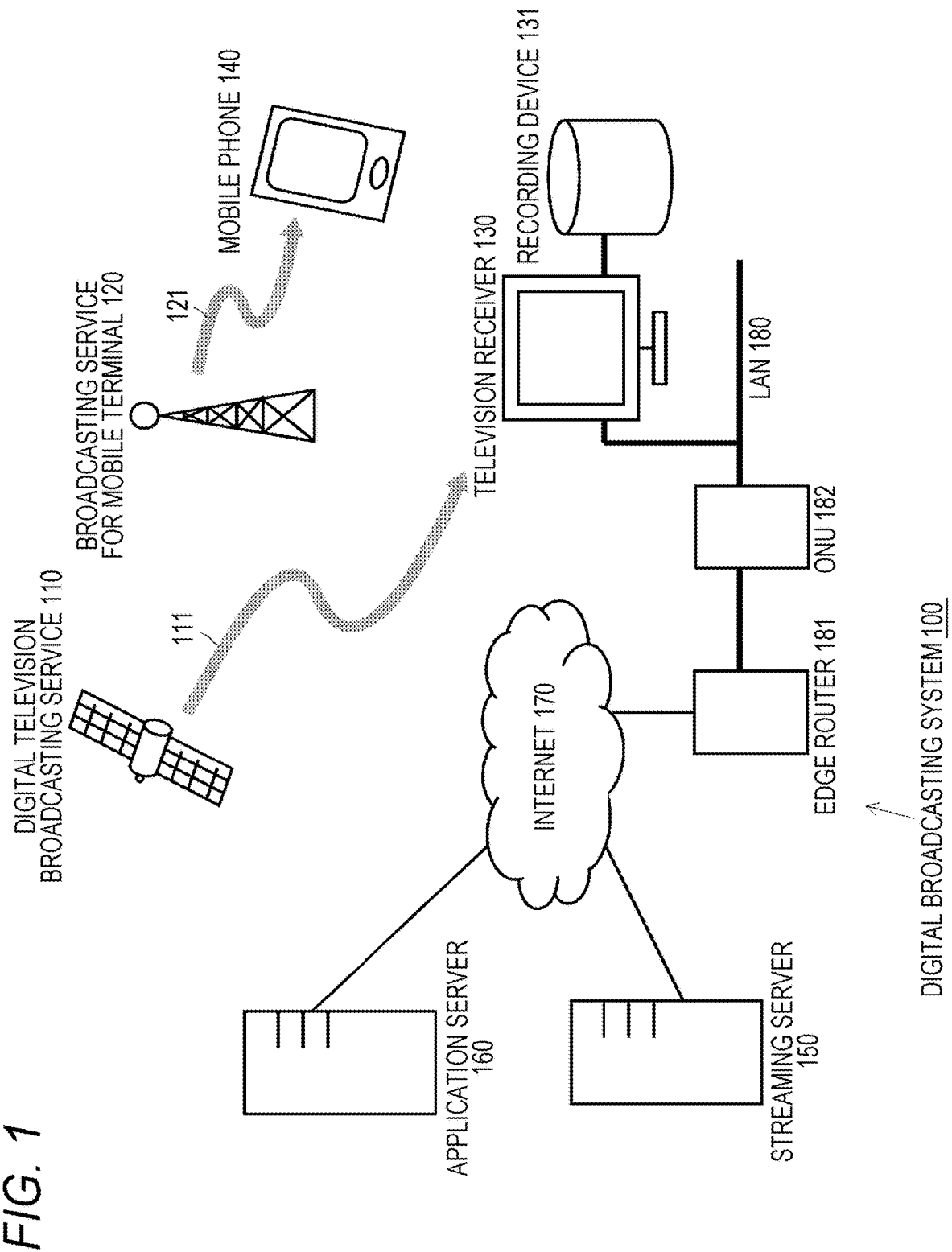
FIG. 1 is a view schematically illustrating a configuration example of a digital broadcasting system 1 to which a technology disclosed in the present description can be applied.

In FIG. 1, a configuration example of a digital broadcasting system 100 to which a technology disclosed in the present description can be applied is schematically illustrated. In the illustrated digital broadcasting system 100, a digital television broadcasting service 110 for a television receiver 130 and a broadcasting service for a mobile phone 120 for a mobile phone 140 or the like are performed with utilization of a ground wave or a satellite wave. A broadcast signal for a mobile phone 121 may be superimposed on a digital television broadcast signal 111 when being transmitted. The broadcast signal includes component, which configures a main body of a program, such as a video stream, an audio stream, and a caption stream, program information, or various different kinds of data for data broadcasting. The digital broadcasting system 100 according to the present embodiment employs an IP system as a transport layer.

When a digital television broadcast signal 111 which reaches a broadcast receiving antenna (not illustrated) provided outside is selected and received with a tuner (not illustrated), a television receiver 130 displays a broadcast program on a screen or accumulates the program into a recording device 131 such as a hard disk. Also, when selecting and receiving a broadcast signal for a mobile phone 121, the mobile phone 140 displays a broadcast program for a mobile terminal onto a screen or records the program into a built-in memory (not illustrated).

Each component of a program such as a video stream, an audio stream, or a caption stream is not only distributed as the broadcast signals 111 and 121 but may be also provided from a streaming server 150 through an IP network such as the Internet 170. Also, program information or various different kinds of data broadcast content may be provided as an application described in a form of Hyper Text Markup Language (HTML) or an eXtensible Markup Language (XML) from an application server 160 to the television receiver 130 or the mobile phone 140 through the Internet 170.

The television receiver 130 is connected to a local area network (LAN) 180 built in a house and can acquire component or data broadcast content of an intended program from the streaming server 150 and the application server 160 on the Internet 170 through an edge router 181 and a line termination device 182 such as an optical network unit (ONU). In a case of employing an IP system as a transport layer, it is possible to designate an IP address and a port number or to pull out an intended component from a transport stream.

As one piece of main information included in the data broadcast content, there is program information. Generally, there is an electronic program guide (EPG) as program information of a digital television broadcasting service. The EPG includes a function to display a program guide, to display detail information of each program, to display a program title during channel-selection, and to search a program with a genre, a program title, or a cast as a keyword. However, there is a problem that a main target of the EPG is a fixed TV which is installed in a house and the EPG is not suitable to provide a service to a device with a different screen size, an aspect ratio of a screen, and a processing function such as a smartphone or a different mobile terminal in a unified manner.

Then, in the present embodiment, as a display form of a program guide or program information of digital television broadcast provided in an IP system, an electronic service guide (ESG) is employed instead of the EPG. By using the ESG, it is possible to provide and display program information in a unified manner with respect to various devices with different screen sizes or different kinds of processing performance. This is because a structure of the ESG (including used tag) is a unified XML format, pieces of describable information are defined according to broadcasting services, and these elements (such as service (channel) information, program information, program detail information, acquisition destination information of program, and information related to purchase in case of pay program) can be selected according to a service.

Note that as a representative specification of the ESG, there is an open mobile alliance mobile broadcast services enabler suite (OMA BCAST).

The ESG includes information of an access method with respect to a broadcasting service which information is, for example, a service description protocol (SDP) or an IP address. The ESG can include a function for processing of channel-selection. For example, in order to start a multimedia session including a form of Session Announcement or the like, the SDP is a protocol which describes the multimedia session (see RFC 2327) and can perform processing of selecting a channel therefrom. However, in a case where operation to directly select a channel from a number button on a remote controller (direct channel-selection) is performed, when the above-described channel-selection function of the ESG is used, there is a problem that it takes a long period until channel-selection is completed since processing of the ESG is performed.

Thus, in the present embodiment, a table of the SDP, that is, an SDPT is arranged in signaling information (service signaling channel (SSC)) transmitted in a transport stream from a transmission side such as a broadcasting station. The SDPT described here is written in a binary section form and service identification information and an SDP are arranged in a header extension part thereof. The service identification information uniquely corresponds to a channel of a broadcast program. Also, the SDP includes an IP address, a port number, attribute information, and the like of each component (such as video stream or audio stream) of a broadcasting channel corresponding to service identification information.

In such a case, on a reception side of a digital broadcasting service such as the television receiver 130 or the mobile phone 140, it becomes possible to acquire an intended SDPT from signaling information SSC easily at high speed by performing section filtering processing with respect to a received transport stream. Then, by accessing a stream of an intended channel based on an IP address and a port number described in an SDP stored in a header extension part of the acquired SDPT, it is possible to perform channel-selection processing at high speed.

That is, on a reception side, it is possible to acquire only an intended SDPT by accessing a fixed IP address transmitting signaling information SSC in a transport stream and by performing filtering with service identification information (service ID) in a header extension part of a fixed offset value.

As described above, with a method of selecting a channel through the SDPT arranged as the signaling information SSC, it is possible to acquire channel-selection information at high-speed compared to a method of selecting a channel by acquiring an SDP from the ESG. Also, it is easy to perform filtering of an intended SDPT from signaling information and reduction of a burden of processing on the reception side can be expected. Note that a detail of the direct channel-selection processing will be described later.

Also, a method of arranging an SDPT in the signaling information SSC transmitted in the transport stream is compatible with architecture of a conventional television receiver. Since a resource in the past can be used, a burden in implementation is reduced.

By arranging an SDP inside the ESG, it is possible to select a channel of a program from the ESG (as described above). However, as described above, when the SDPT is transmitted as the signaling information SSC in the transport stream, it is necessary to perform double maintenance with the SDP in the ESG. Also, there is a problem that inconsistency inversions of the SDP in the ESG and the SDP in the SDPT transmitted as the signaling information SSC may be generated.

Thus, in the present embodiment, not an SDP itself but a uniform resource identifier (URI) of the SDP is described as the SDP inside the ESG. Also, similarly, an URI of the SDP is described in the SDPT transmitted as the signaling information SSC. Accordingly, in a case of referring to the SDP from the ESG (such as case of performing channel-selection operation from program guide of ESG) in the reception device, a corresponding SDP is acquired by specification of a corresponding SDPT in the signaling information SSC based on service identification information corresponding to a selected channel and an URI of the SDP in the ESG. According to such a method, it becomes not necessary to describe the SDP in the ESG and to perform double maintenance of the SDP. Also, it is possible to prevent inconsistency between the SDPT and the SDP. Also, by writing the SDP in the URI, it becomes possible to designate a server or the like on the Internet. Thus, various kinds of service operation become possible. Note that a detail of a processing procedure of operation of channel-selection from the program guide of the ESG will be described later.

Also, in order to perform a display of the ESG on the reception side, a complicated procedure such as finding a bootstrap of the ESG from a broadcast signal, checking an IP address of a file delivery over unidirectional transport protocol (FLUTE) session, acquiring basic information of the ESG transmitted from an ESG provider discovery descriptor or an ESG access descriptor in a bootstrap session, and selecting the ESG is generally necessary and the processing takes a long period.

Thus, in the present embodiment, a bootstrap of the ESG is described in signaling acquired by the reception side in initial scanning. Also, the reception device saves the bootstrap acquired from the signaling during the initial scanning into a non-volatile memory such as a non volatile RAM (NVRAM) in a device. In such a manner, in a case where a request for an ESG display is made in the reception device, a bootstrap is not acquired from a broadcast signal each time but is loaded from the NVRAM. Thus, it is possible to display the ESG at high speed.

In FIG. 2, a protocol stack applied to transmission of a broadcast signal in the digital broadcasting system 100 according to the present embodiment is illustrated as an example.

A packet of the signaling 211 and that of a data link layer 212 are transmitted by utilization of a packet structure of a physical layer 201. On the reception side, information stored into the signaling 211 is acquired during the initial scanning.

Also, in the illustrated example, an IP system is employed as the transport layer. A transmission system of a packet on an IP layer 221 (IP packet) is prescribed by a user datagram protocol (UDP) layer 231 which is a connection-less communication protocol.

The transport stream includes sessions 241 to 243 of a service signaling channel (SSC) to transmit signaling information, FLUTE which is an accumulation-type file transmission protocol, a real-time transport protocol (RTP) and a real-time transport control protocol (RTCP) of a real-time system.

In the present embodiment, a table of the SDP, that is, an SDPT is arranged in an SSC 241, a detail thereof being described later. Also, on the session in a FLUTE layer 242, a plurality of files of ESG data 251, NRT (non-real-time system) data 252, and the like are transmitted. In the present embodiment, in an SDP of the ESG data 251, a URI of the SDP is described instead of the SDP itself, a detail thereof being described later. A session in the FLUTE layer to transmit each file can be designated by an IP address and a port number. Also, on an RTP/RTCP session 243, a stream of a component of a main body of a broadcast program which stream is, for example, a video (V), audio (A), or a closed caption (CC) (such as caption) is transmitted.

A regulatory and supervisory agency of broadcast communication enterprise which agency is, for example, a federal communications commission (FCC) assigns a broadcasting frequency band (physical channel) of a predetermined frequency width to each broadcasting station. It is to be understood that a protocol stack structure illustrated in FIG. 2 exists in each broadcasting frequency band (physical channel).

Figure 3:
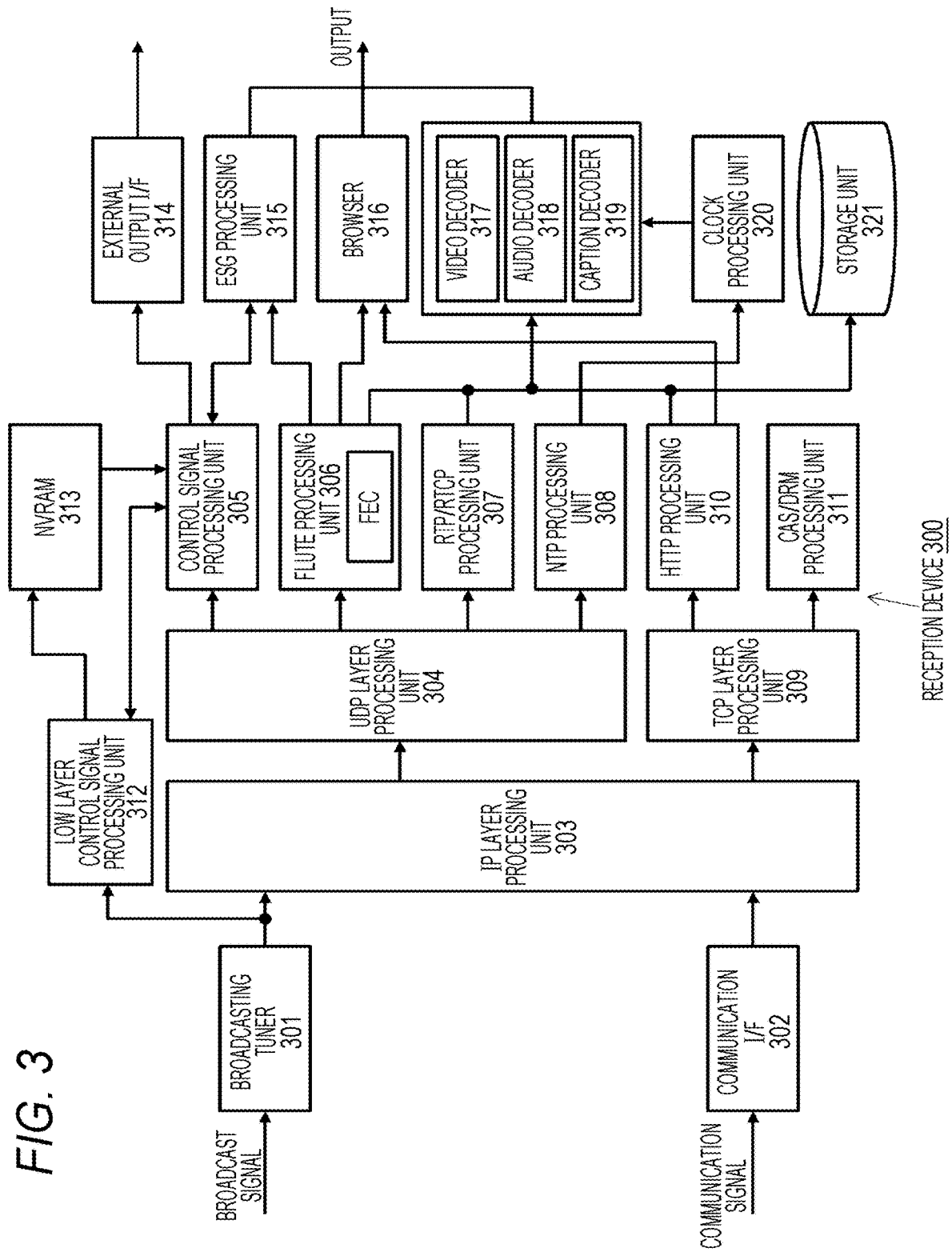
FIG. 3 is a view illustrating a configuration example of a reception device 300.

In FIG. 3, a configuration example of a reception device 300 to receive a broadcast signal having a protocol stack illustrated in FIG. 2 is illustrated. The reception device 300 corresponds to the television receiver 130 or the mobile phone 140. The reception device 300 is operated by a remote controller or the like. However, a function of operation of a remote controller is not illustrated.

The broadcasting tuner 301 selects and receives the digital television broadcast signal 111 or the broadcast signal for a mobile phone 121 which reaches a broadcast receiving antenna (not illustrated). Also, a communication interface (I/F) 302 receives a communication signal from the streaming server 150 or the application server 160 through the Internet 170 and the LAN 180 and executes processing corresponding to a physical layer and a data link layer.

An IP layer processing unit 303 performs processing of an IP layer with respect to a reception signal in the broadcasting tuner 301 or the communication interface 302.

An UDP layer processing unit 304 performs processing of an UDP datagram transmitted in the broadcast signal 111 or 121 by utilization of an IP protocol.

A control signal processing unit 305 performs processing of a control signal such as signaling information (service signaling channel (SSC)) transmitted by the UDP datagram. In the present embodiment, a table of the SDP, that is, an SDPT is arranged in the SSC. The control signal processing unit 305 performs direct channel-selection processing or the like by using this SDPT, a description thereof being made later.

A FLUTE processing unit 306 performs processing of a session in the FLUTE layer transmitted by the UDP datagram and extracts an ESG or a non-real-time (NRT) file. Also, the processing performed by the FLUTE processing unit 306 includes forward error correction (FEC).

An RTP/RTCP processing unit 307 performs processing of a real-time stream transmitted in the UDP datagram and extracts each component such as an image (V), audio (A), or a caption (CC) of a main body of a broadcast program.

A network time protocol (NTP) processing unit 308 accesses an NTP server based on an NTP protocol and performs processing of time information. Generally, the NTP server transmits the time information in a certain cycle by using an UDP packet.

A transmission control protocol (TCP) layer processing unit 309 performs processing of a TCP stream transmitted as a communication signal by utilization of an IP protocol.

A Hyper Text transfer Protocol (HTTP) processing unit 310 performs reception processing of content such as an HTML transmitted in the TCP stream.

A conditional access system (CAS)/digital rights management (DRM) processing unit 311 performs processing of viewing limiting control of content received through broadcasting or communication or processing of copyright protection (such as limitation or detection of replication).

A low layer control signal processing unit 312 performs processing of a low layer control signal limited to a physical layer or a data link layer with respect to a broadcast signal. For example, signaling is acquired by initial scanning. In the present embodiment, the low layer control signal processing unit 312 records information of the signaling acquired in the initial scanning into the NVRAM 313, a detail thereof being described later.

An external output interface (I/F) 314 performs an external output of a control signal processed by the control signal processing unit 305.

An ESG processing unit 315 performs display processing of a program guide or program information by using an ESG extracted from the FLUTE layer by the FLUTE processing unit 306.

A browser 316 performs browsing processing of content such as non-real-time data extracted by the FLUTE processing unit 306 from the FLUTE layer or the HTML reception processing of which is performed by the HTTP processing unit 310.

A video decoder 317, an audio decoder 318, and a caption decoder 319 respectively decode components which are the image (V), the audio (A), and the caption (CC) extracted from the real-time stream by the RTP/RTCP processing unit 307. Then, based on the time information acquired by the NTP processing unit 308, a clock processing unit 320 synchronizes decoding processing of the component performed by the video decoder 317, the audio decoder 318, and the caption decoder 319.

A recording unit 321 arbitrarily records information output from the FLUTE processing unit 306, the RTP/RTCP processing unit 307, the NTP 308, and the HTTP processing unit 309.

B. Initial Scanning

Figure 4:
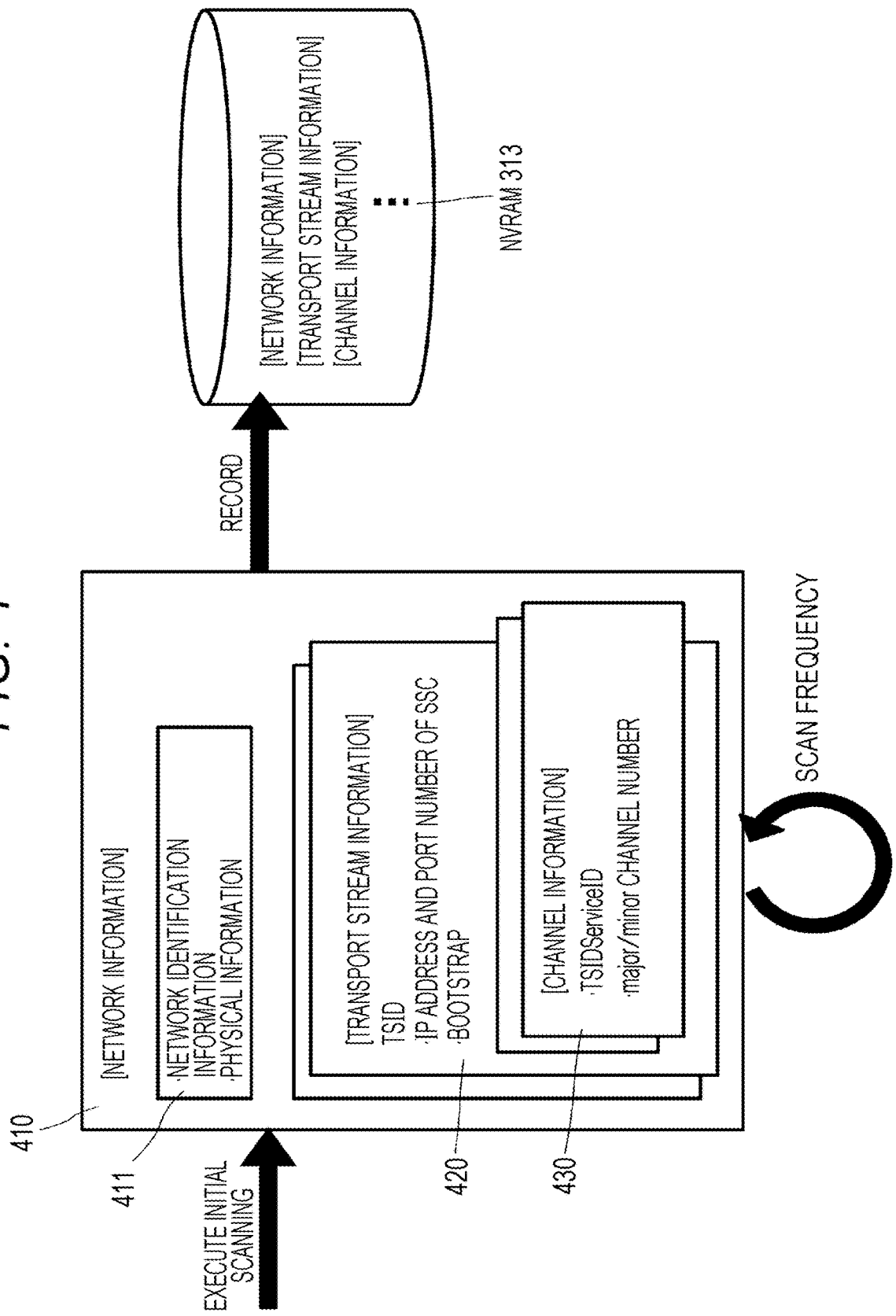
FIG. 4 is a view schematically illustrating a mechanism of initial scanning performed by the reception device 300.

The reception device 300 performs initial scanning and acquires network information, for example, when utilization is started. In FIG. 4, a mechanism of the initial scanning performed the reception device 300 is schematically illustrated. The low layer control signal processing unit 312 in the reception device 300 executes scanning of each broadcasting frequency band (physical channel) assigned to each broadcasting station, acquires network information, transport stream information, and channel information, and records the information into the NVRAM 313.

Network information 410 acquired in the initial scanning includes network identification information (NID) to identify a scanned broadcasting frequency band, physical information (such as frequency) 411 thereof, and transport stream information 420 of each transport stream included in the broadcasting frequency band. Each transport stream includes transport stream identification information (TSID). A regulatory and supervisory agency of broadcast communication enterprise which agency is, for example, the FCC performs assignment of a broadcasting frequency band (physical channel) and a TSID.

Also, the transport stream information 420 includes an IP address and a port number of the SSC 241 (see FIG. 2) transmitted in the transport stream, a bootstrap (described later) of the ESG acquired from the signaling 211, and channel information 430 of each broadcasting channel included in the transport stream.

The channel information 430 includes service identification information (TSID service ID) of the broadcasting channel and a channel (CH) number. There is a case where major and minor channel numbers are included in one transport stream. A channel number selected by operation of a remote controller or the like uniquely corresponds to service identification information.

In FIG. 5, an image of network information, transport stream information, and channel information being recorded in the NVRAM 313 is illustrated. As illustrated, corresponding network identification information (NID) and transport stream identification information (TSID) are associated to each piece of service identification information (Service ID). Thus, it is possible to quickly check an NID and a TSID corresponding to a channel number selected by the operation of the remote controller or the like.

Figure 6:
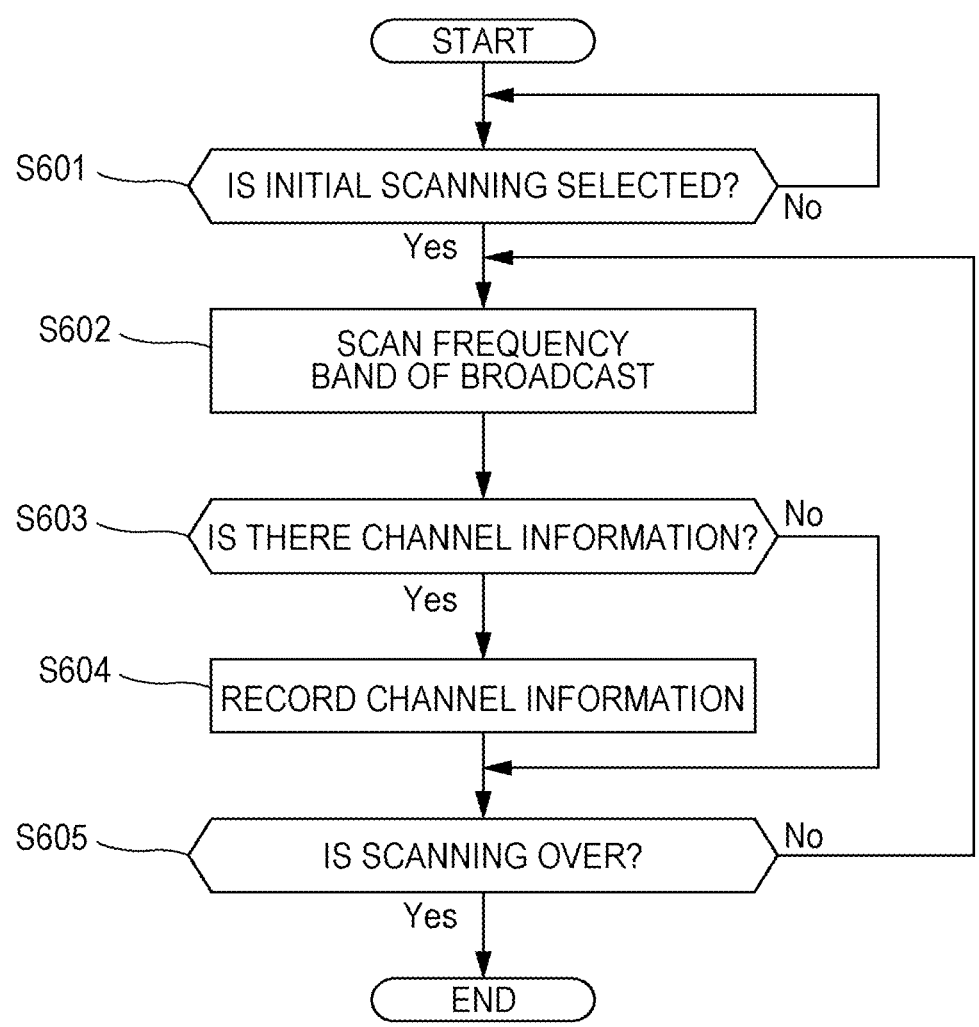
FIG. 6 is a flowchart illustrating a processing procedure of the initial scanning performed by the reception device 300.

In FIG. 6, a processing procedure of the initial scanning performed by the reception device 300 is illustrated in a form of a flowchart.

When initial scanning is selected by operation of the remote controller or the like performed by a user (Yes in step S601), the low layer control signal processing unit 312 scans a frequency band of a broadcast through the broadcasting tuner 301 (step S602).

Here, when channel information is found (Yes in step S603), the low layer control signal processing unit 312 acquires the channel information from signaling and records the information into the NVRAM 313 (step S604).

When scanning of frequency bands of all broadcasts is over (Yes in step S605), the entire routine of the processing is ended. Also, when there is still a not-scanned frequency band of a broadcast (No in step S605), the processing goes back to step S602 and a frequency band which is not yet processed is repeatedly scanned.

The low layer control signal processing unit 312 acquires signaling 211 (see FIG. 2) from each broadcasting frequency band (channel) during the initial scanning. In the present embodiment, a bootstrap of the ESG is described in the signaling 211. In FIG. 7, a syntactic structure (syntax) of a descriptor of a bootstrap (bootstrap_descriptor) of the ESG which descriptor is stored in the signaling 211 is written. Into a descriptor_tag field indicated by a reference number 701, tag information of the descriptor is written. Into a descriptor_length field indicated by a reference number 702, a data length of the descriptor is written. Into a service_id field indicated by a reference number 703, service identification information is written. An IP_version_flag indicated by a reference number 704 is a flag indicating a version (whether it is IPv4 or IPv6) of a used IP system. Into a Source_IP_address indicated by a reference number 705, an IP address of a transmission source of this transport stream is written. Into a destination_IP_address and a destination_port_num indicated by reference numbers 706 and 707, an IP address and a port number of a session in the FLUTE layer transmitting ESG data are respectively written. Into a TSI indicated by a reference number 708, a transport session identifier (TSI) of the ESG is written.

In the present embodiment, the low layer control signal processing unit 312 records the bootstrap of the ESG acquired from the signaling 211 into the NVRAM 313 during the initial scanning. When a display of the ESG is requested subsequently in the reception device 300, a bootstrap is not acquired from the broadcast signal each time but is loaded from the NVRAM 313. Thus, there is an advantage that the ESG can be displayed at high speed.

C. Direct Channel-Selection

In the present embodiment, the ESG is employed as a display form of a program guide or program information of television broadcasting. A structure of the ESG (including used tag) is a unified XML format. Also, pieces of describable information are defined according to broadcasting services and these elements can be selected according to a service. Thus, it is possible to provide and display program information in a unified manner with respect to various devices with different screen sizes or different kinds of processing performance.

The ESG includes access method information such as an SDP or an IP address with respect to a broadcasting service and can include a processing function of channel-selection. However, since processing of the ESG is performed when operation to directly select a channel from a number button on a remote controller is performed, there is a problem that it takes a long period until channel-selection is completed.

Thus, in the present embodiment, a table of an SDP, that is, an SDPT of each piece of service identification information is arranged in the SSC 241 transmitted in the transport stream. Accordingly, when receiving an SDP from signaling information easily at high speed by performing section filtering processing with respect to a received transport stream, the reception device 300 can perform channel-selection processing (direct channel-selection) at high speed based on described contents in the SDP.

Figure 8:
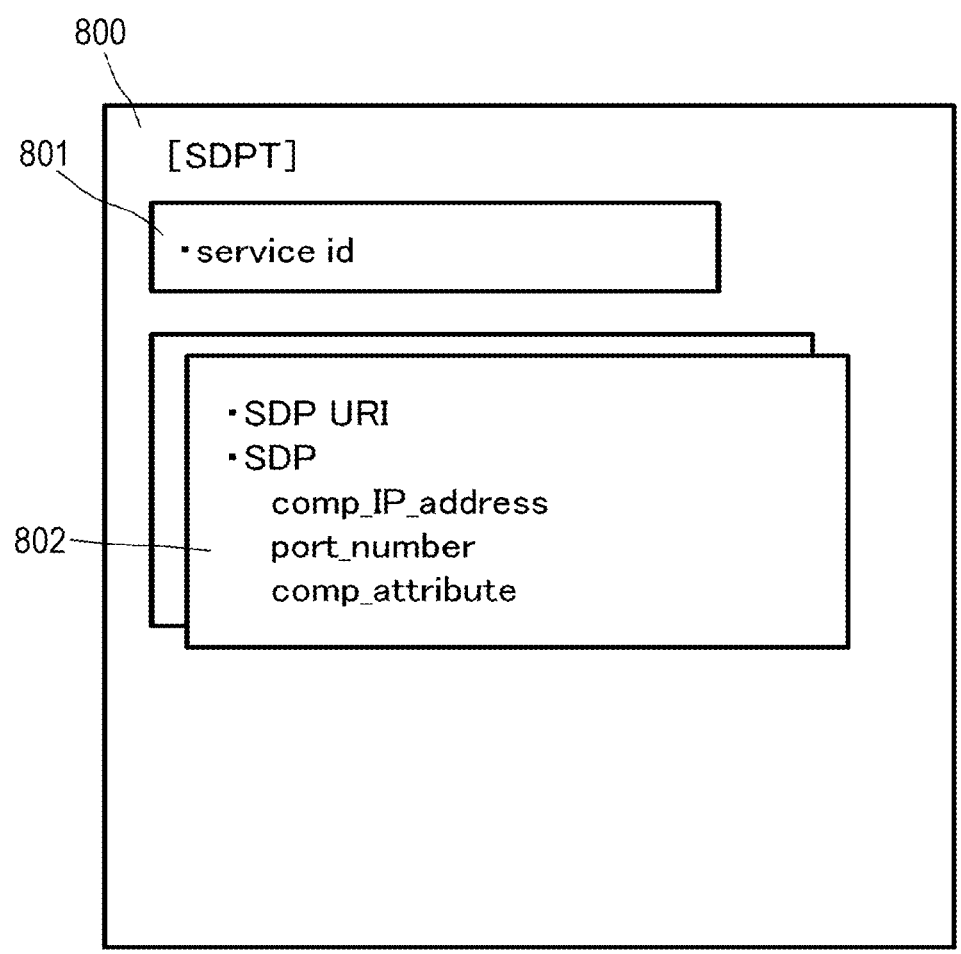
FIG. 8 is a view schematically illustrating a structure of an SDPT arranged in an SSC.

In FIG. 8, a structure of the SDPT arranged in the SSC is illustrated schematically. Also, a syntax example (syntax) of the SDPT is illustrated in FIG. 15. The SDPT 800 illustrated in FIG. 8 is written in a binary-section form, service identification information (service id) 801 and an SDP 802 being arranged in a header extension part thereof. The service identification information 801 uniquely corresponds to a channel of a broadcast program. As described later, a URI of the SDP is described in the SDP of the ESG. Into the SDP 802 in the SDPT 800, the URI of the SDP is also described. Also, the SDP 802 in the SDPT 800 includes an IP address of each component (such as video stream or audio stream) of a broadcasting channel corresponding to the service identification information 801 (copm_IP_address), a port number (port_number), attribute information of the component (comp_attribute).

Thus, when channel-selection operation is performed with a remote controller or the like, the reception device 300 can perform section filtering processing with respect to a corresponding transport stream and can acquire an SDP from the SSC 241 easily at high speed. Then, by accessing a stream of an intended channel based on an IP address and a port number described in the acquired SDP, it is possible to perform channel-selection processing directly without performing processing of the ESG.

Figure 9:
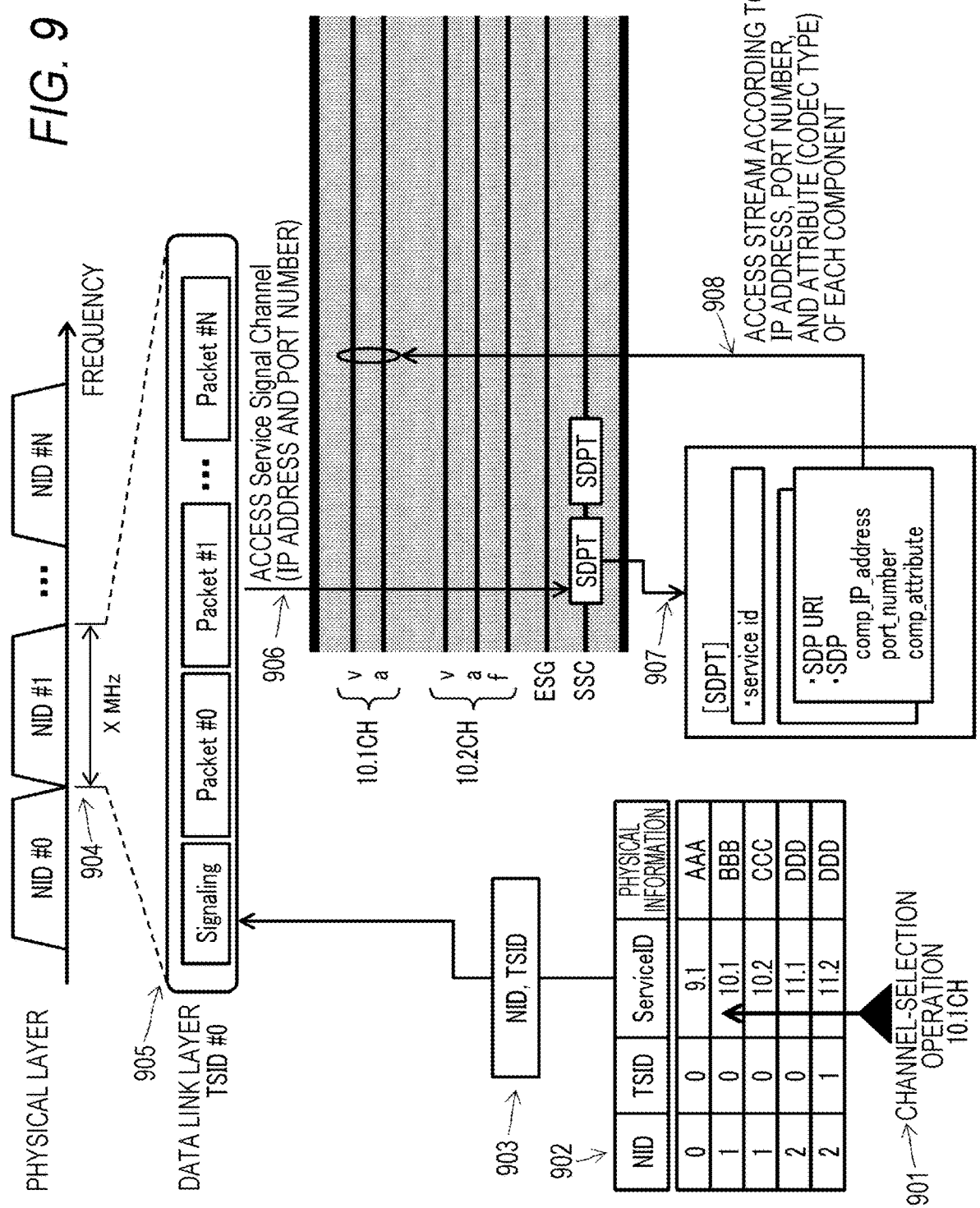

In FIG. 9, a mechanism of performing direct channel-selection according to channel-selection operation on a remote controller or the like is illustrated.

It is assumed that operation of selecting a 10.1 CH is performed with a remote controller or the like as indicated by a reference number 901. Here, when referring to information recorded in the NVRAM 313 as indicated by a reference number 902, the control signal processing unit 305 can acquire network identification information (NID) and transport stream identification information (TSID) of service identification information corresponding to a selected channel as indicated by a reference number 903. In this case, it is assumed that NID #1 and TSID #0 are acquired. A regulatory and supervisory agency of broadcast communication enterprise which agency is, for example, the FCC performs assignment of a broadcasting frequency band (physical channel) and a TSID.

As indicated by a reference number 904, the broadcasting tuner 301 performs tuning to a broadcasting frequency band corresponding to the NID #1. Then, as indicated by a reference number 905, the IP layer processing unit 303 processes a transport stream TSID #0 flowing in the NID #1. In the transport stream, a plurality of streams including the SSC is transmitted.

In the present embodiment, an SDPT is arranged in an SSC. Also, by the initial scanning, an IP address and a port number of an SSC transmitted in a transport stream are previously recorded in the NVRAM 313 (see the above and FIG. 4). As indicated by a reference number 906, the control signal processing unit 305 accesses the SSC in the transport stream based on the IP address and the port number of the SSC read from the NVRAM 313. In the SSC, an SDPT of each piece of service identification information is arranged. Then, as indicated by a reference number 907, the control signal processing unit 305 acquires a corresponding SDPT from the SSC by performing section filtering processing based on the service identification information.

The SDP in the SDPT stores an IP address, a port number, and attribute information (codec type) of each component (such as video stream or audio stream) of a broadcasting channel corresponding to the service identification information (see the above and FIG. 8). Thus, based on the IP address, the port number, and the attribute (codec attribute) acquired from the SDP in the SDPT, the RTP/RTCP processing unit 307 can access each of components, a video (V) and audio (A), of the selected broadcasting channel 10.1 CH as indicated by a reference number 908. Then, the video decoder 317 and the audio decoder 318 are synchronized with each other and respectively decode the components based on the time information acquired by the NTP processing unit 308. Then, an output as a broadcast program is performed.

Figure 10:
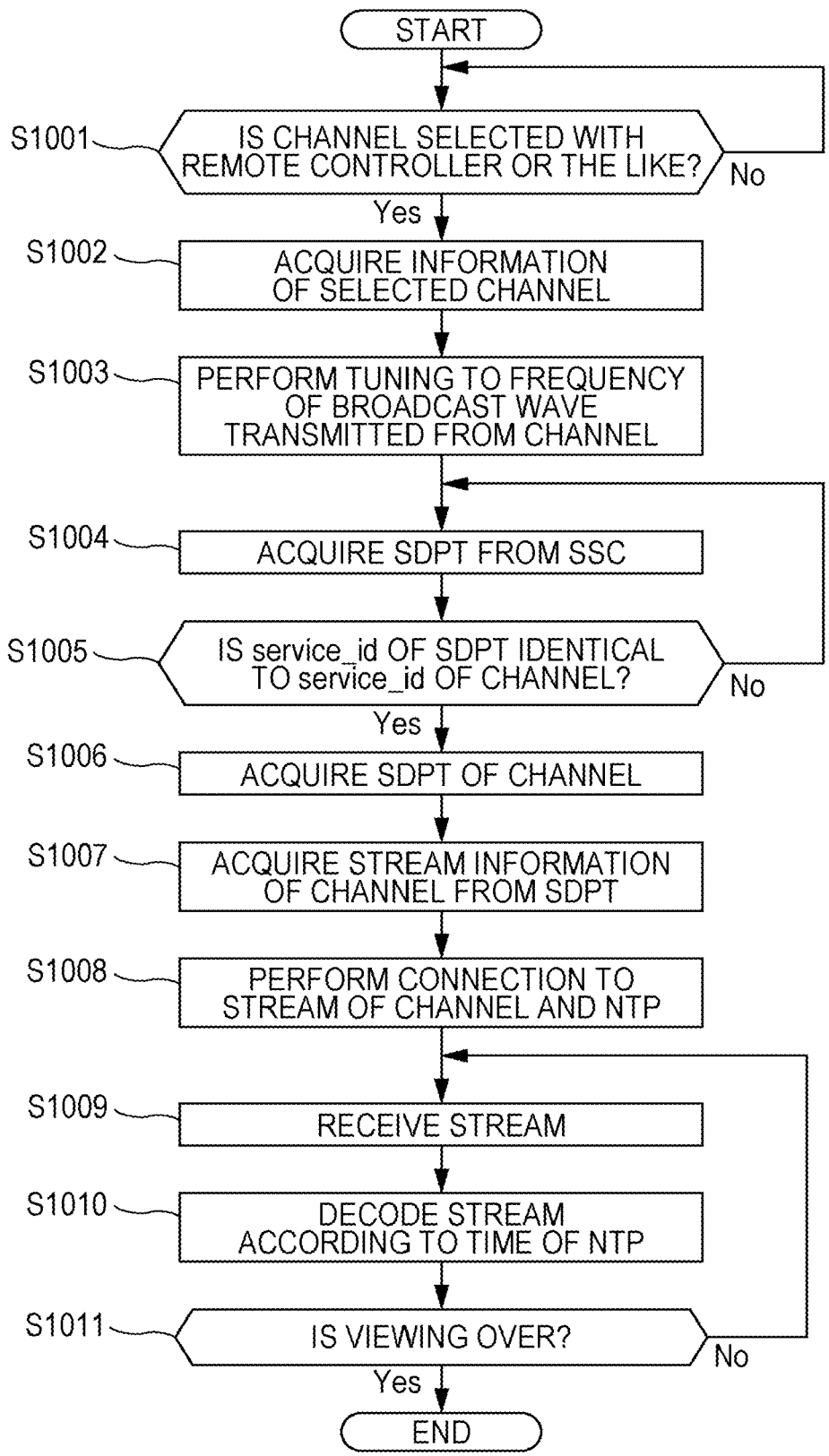
FIG. 10 is a flowchart illustrating a processing procedure of direct channel-selection performed by the reception device 300.

In FIG. 10, a processing procedure of direct channel-selection performed by the reception device 300 is illustrated in a form of a flowchart. Also, in FIG. 11, a flow of signaling and a flow of a stream/data of the inside in a case where the reception device 300 performs direct channel-selection are illustrated.

When a user performs operation of selecting a channel with a remote controller or the like (Yes in step S1001), the control signal processing unit 305 acquires, from the NVRAM 313, network identification information and transport stream identification information as information of the selected channel.

Figure 11:
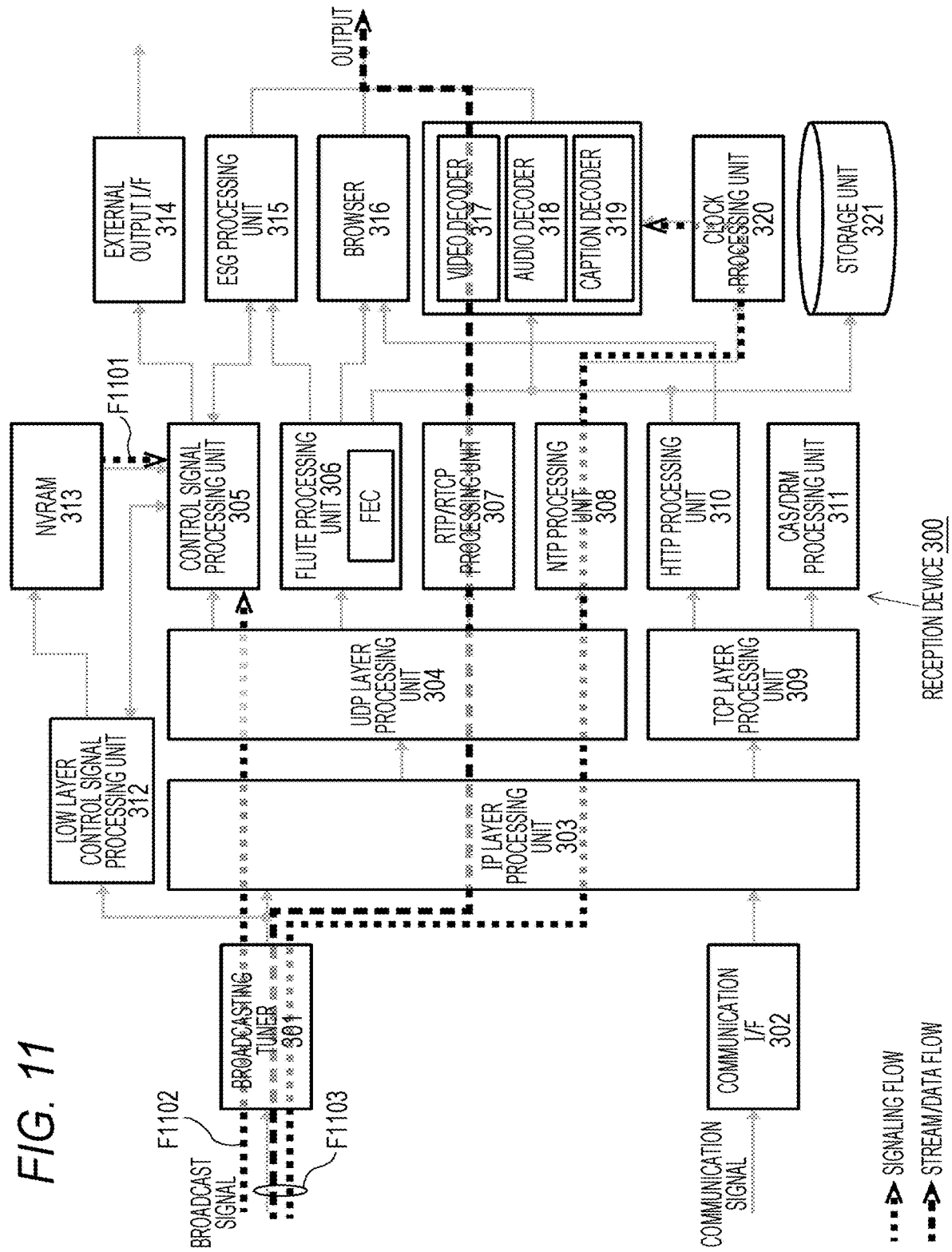
FIG. 11 is a view illustrating a flow of signaling and a flow of a stream/data of the inside in a case where the reception device 300 performs direct channel-selection.

Note that the processing in step S1001 and S1002 corresponds to a signaling flow F1101 in FIG. 11.

The broadcasting tuner 301 performs tuning to a frequency band of a broadcast wave transmitting the corresponding channel (step S1003). Then, the IP layer processing unit 303 processes a transport stream flowing in the frequency band.

The control signal processing unit 305 accesses the SSC in the transport stream based on the IP address and the port number of the SSC read from the NVRAM 313 and acquires the SDPT (step S1004). Then, it is checked whether service identification information of the SDPT is identical to service identification information of the selected channel (step S1005). When the information is not identical (No in step 1005), the processing goes back to step S1004 and acquisition of the SDPT is repeatedly performed.

The SDPT with the identical service identification information is the SDPT of the selected channel (step S1006). Then, the control signal processing unit 305 can acquire, from the acquired SDPT, stream information of the selected channel, that is, an IP address, a port number, and attribute information (codec type) of each component (such as video stream or audio stream) (step S1007).

Note that the processing in step S1003 to S1007 corresponds to a signaling flow F1102 in FIG. 11.

The RTP/RTCP processing unit 307 is connected to a stream of each component based on the acquired stream information. Also, the NTP processing unit 308 receives a UDP packet transmitted from the NTP server in a certain cycle and performs processing of time information (step S1008).

Then, the RTP/RTCP processing unit 307 performs processing of receiving a connected video stream and audio stream (step S1009). The video decoder 317 and the audio decoder 318 are synchronized with each other based on the time information acquired by the NTP processing unit 308 and respectively perform decoding of the received video stream and audio stream (step S1010). Until viewing is over (No in step S1011), reception of a stream (step S1009) and decoding processing (step S1010) are repeatedly performed.

Note that the processing in step S1008 to S1011 corresponds to signaling and a stream/data flow F1103 in FIG. 11.

Figure 13:
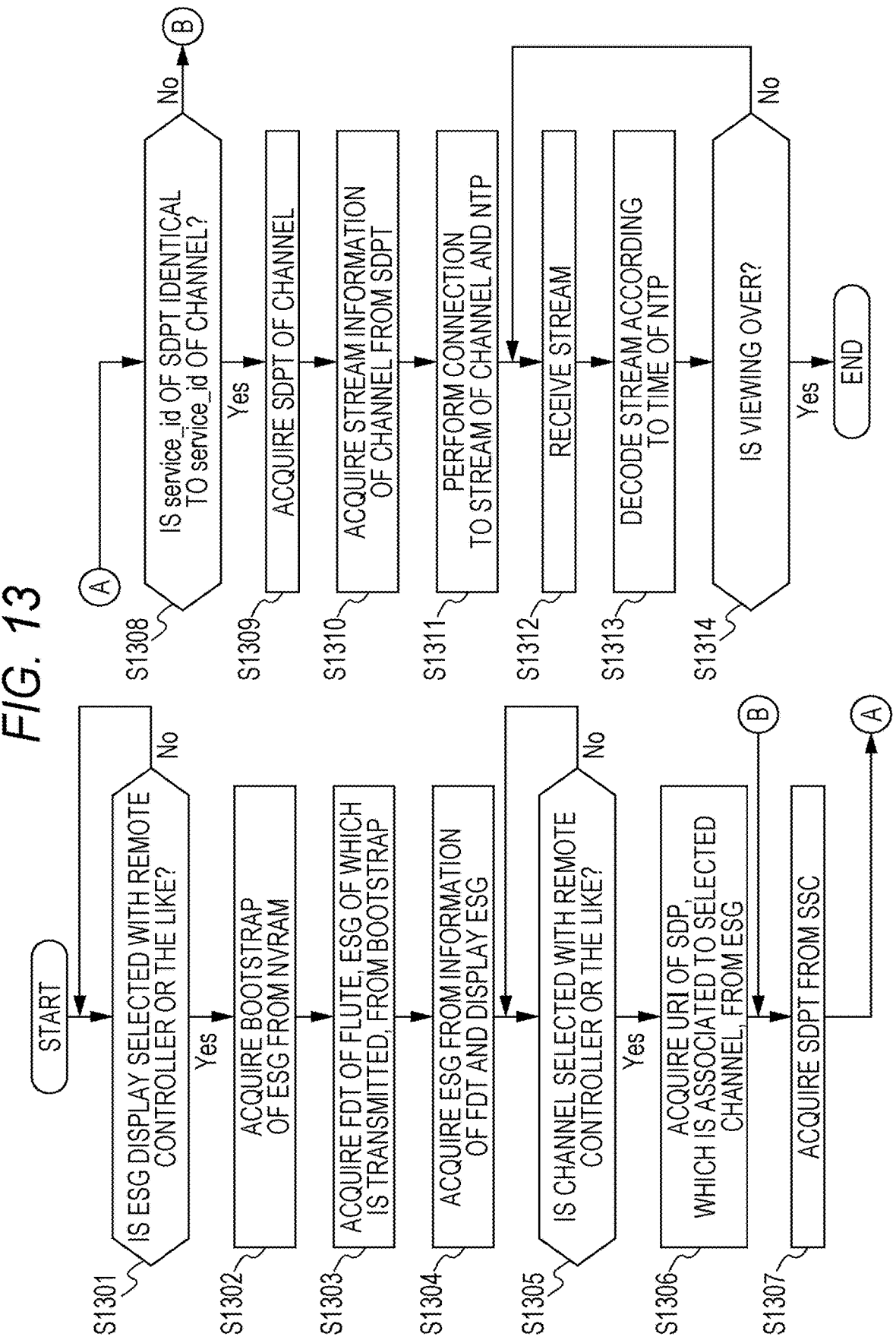
FIG. 13 is a flowchart illustrating a processing procedure of channel-selection from the ESG performed by the reception device 300.

By arranging the SDPT in the signaling information SSC transmitted in the transport stream transmitted from the broadcasting station, the reception device 300 can acquire an intended SDPT by the section filtering processing and can perform channel-selection processing easily at high speed without performing processing of the ESG, as illustrated in FIG. 12 and FIG. 13. Also, a method of arranging the SDPT in the SSC is compatible with architecture of a conventional television receiver. Since a resource in the past can be used, a burden in implementation is reduced.

D. Channel-Selection from ESG

In the present embodiment, the ESG is employed as a display form of a program guide or program information of television broadcasting. A structure of the ESG (including used tag) is a unified XML format. Also, pieces of describable information are defined according to broadcasting services and these elements can be selected according to a service. Thus, it is possible to provide and display program information in a unified manner with respect to various devices with different screen sizes or different kinds of processing performance.

The ESG includes access method information such as an SDP or an IP address with respect to a broadcasting service and can include a processing function of channel-selection. However, in order to perform a display of the ESG, generally a complicated procedure of finding a bootstrap of the ESG from a broadcast signal, checking an IP address of a FLUTE session, acquiring basic information of the ESG transmitted from an ESG provider discovery descriptor or ESG access descriptor in a bootstrap session, and selecting the ESG is necessary. The processing takes a long period.

Thus, in the present embodiment, the bootstrap of the ESG is described in the signaling acquired in the initial scanning of the broadcast signal. Also, the reception device 300 records the bootstrap acquired from the signaling during the initial scanning into the NVRAM 313 (see the above and FIG. 4). When a display of the ESG display is requested, the reception device 300 does not acquire a bootstrap from the broadcast signal each time but loads the bootstrap from the NVRAM. Thus, it is possible to display the ESG at high speed.

By arranging an SDP inside the ESG, it is possible to select a channel of a program from the ESG. However, an SDPT arranged in the SSC also includes the SDP. Thus, there is a problem that it is necessary to perform double maintenance of the SDP and inconsistency due to a difference in versions of the two may be generated.

Thus, in the present embodiment, an URI of the SDP is described in the SDP inside the ESG. Accordingly, in a case where a channel is selected from a program guide in the ESG and the SDP is referred to in the ESG in the reception device 300, a corresponding SDPT is specified from the SSC and the SDP is acquired based on service identification information corresponding to the selected channel and an URI of the SDP. It is possible to access each component of the selected channel based on an IP address, a port number, and attribute (codec attribute) which are described in the SDP. An example of the SDP is illustrated in FIG. 16.

According to such a channel-selecting method, it is not necessary to describe an SDP itself in the ESG and it is possible to prevent inconsistency between the SDPT and the SDP. Also, by writing the SDP in the URI, it becomes possible to designate a server or the like on the Internet. Thus, various kinds of service operation become possible.

In FIG. 12, a mechanism of selecting a channel from the ESG in the reception device 300 is illustrated.

As indicated by a reference number 1201, it is assumed that an ESG display is instructed with a remote controller or the like. In a bootstrap of the ESG, an IP address and a port number (destination_IP_address and destination_port_num) of a session in a FLUTE layer transmitting ESG data are described.

When acquiring information of an IP address and a port number from bootstrap information recorded in the NVRAM 313, the control signal processing unit 305 accesses a session in the FLUTE layer transmitting the ESG and first refers to a file derivery table (FDT), as indicated by a reference number 1202. Each object such as a file of transmitting the session in the FLUTE layer has a unique transmission object identifier (TOI). However, since a TOI of the FDT is fixed to 0, it is possible to acquire the FDT by searching for an object with a TOI=0 in the session.

In the FDT, index information corresponding to each file transmitted in the same session is stored. The index information includes a TOI of a file, a file name, a file type (content type), and positional information (content location).

As indicated by a reference number 1203, the control signal processing unit 305 finds index information of the ESG from the FDT and acquires the ESG. A service guide derivery unit (ESG-SGDU) is a container to house a fragment necessary for configuration of the ESG. A service guide delivery descriptor (ESG-SGDD) notifies transmission session information where the SGDU is placed. Also, the ESG-SGDD notifies an information descriptor entry related to an entry point to receive grouping information and a notification message with respect to the SGDU. Then, as indicated by a reference number 1204, the ESG processing unit 315 displays the acquired ESG.

As indicated by a reference number 1205, when operation of selecting a channel (such as 10.1 CH) is performed on the ESG display with a remote controller or the like, the ESG processing unit 315 acquires an SDP URI from a corresponding fragment (fragment SDP) in the ESG-SGDU.

Also, in the present embodiment, by the initial scanning, an IP address and a port number of an SSC transmitted in the transport stream are previously recorded into the NVRAM 313 (see the above and FIG. 4). The control signal processing unit 305 accesses the SSC based on the IP address and the port number of the SSC read from the NVRAM 313. Then, as indicated by a reference number 1206, the control signal processing unit 305 performs section filtering processing and acquires a corresponding SDPT based on service identification information corresponding to the selected channel. The control signal processing unit 305 may cash the latest SDPT periodically transferred in the SSC.

Then, as indicated by the reference number 1207, the control signal processing unit 305 selects, from the SDPT, an SDP corresponding to the SDP URI acquired from the ESG-SGDU.

The SDP stores an IP address, a port number, and attribute information (codec type) of each component (such as video stream or audio stream) of a broadcasting channel corresponding to the service identification information (see the above and FIG. 8). Thus, based on the IP address, the port number, and the attribute (codec attribute) acquired from the SDP in the SDPT, the RTP/RTCP processing unit 307 can access a stream of each of the components, a video (V) and audio (A), of the selected broadcasting channel 10.1 CH as indicated by a reference number 1208. Then, the video decoder 317 and the audio decoder 318 are synchronized with each other and respectively decode the components based on the time information acquired by the NTP processing unit 308. Then, an output as a broadcast program is performed.

In FIG. 13, a processing procedure of channel-selection from the ESG performed by the reception device 300 is illustrated in a form of a flowchart. Also, in FIG. 14, a flow of signaling and a flow of a stream/data of the inside in a case where the reception device 300 selects a channel from the ESG are illustrated.

When an ESG display is instructed with a remote controller or the like (Yes in step S1301), the control signal processing unit 305 acquires bootstrap information from the NVRAM 313 (step S1302).

Figure 14:
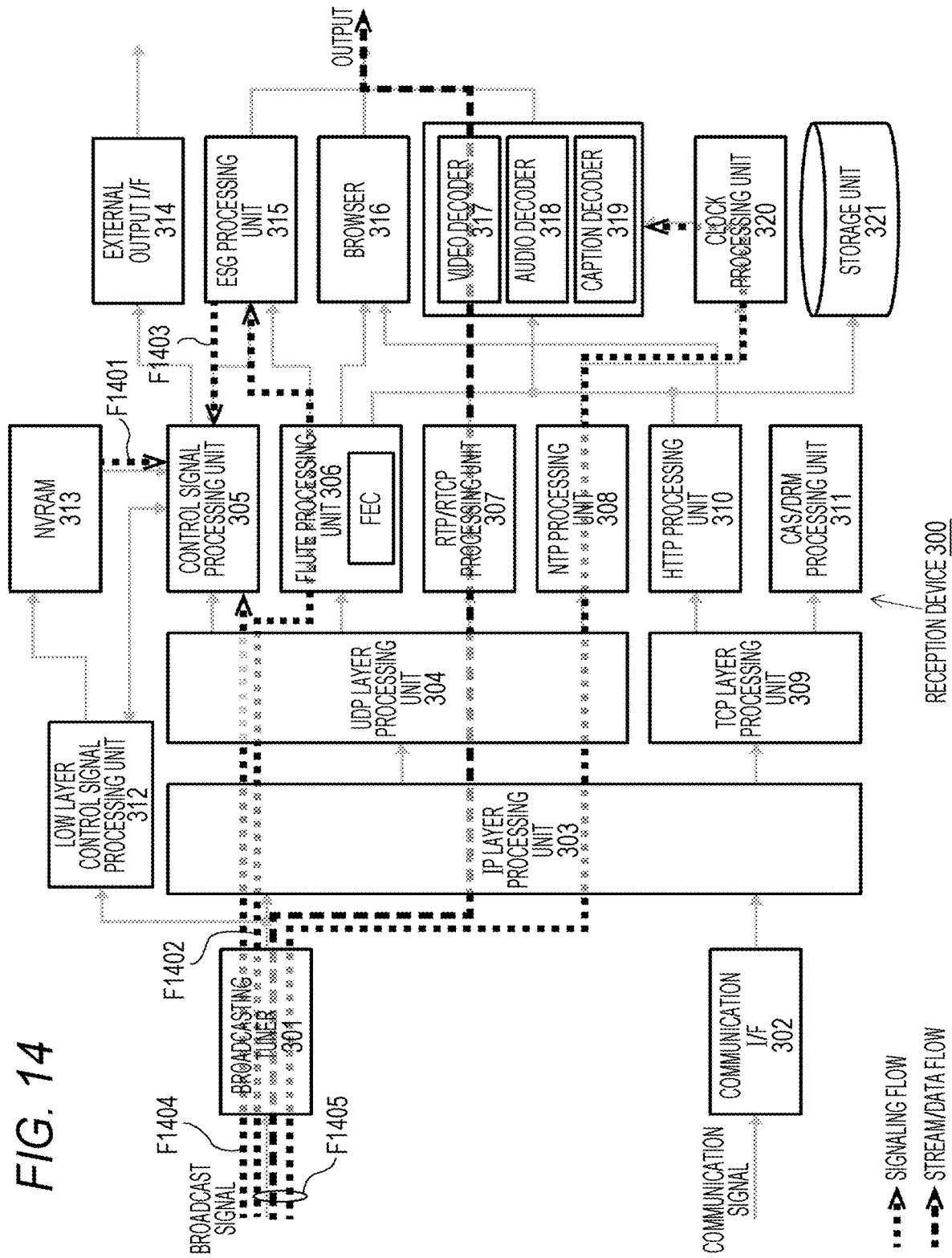
FIG. 14 is a view illustrating a flow of signaling and a flow of a stream/data of the inside in a case where the reception device 300 selects a channel from the ESG.

Note that the processing in step S1301 and S1302 corresponds to a signaling flow F1401 in FIG. 14.

Then, based on information of an IP address and a port number described in bootstrap information, the FLUTE processing unit 306 is connected to a session in the FLUTE layer, in which the ESG is transmitted, and acquires an FDT (step S1303). Then, the FLUTE processing unit 306 finds index information of the ESG from the FDT and acquires the ESG and the ESG processing unit 315 displays the ESG (step S1304).

Note that the processing in step S1303 and S1304 corresponds to a stream/data flow F1402 in FIG. 14.

When operation of selecting a channel is performed on the ESG display with the remote controller or the like (Yes in step S1305), the ESG processing unit 315 acquires, from the ESG, an URI of an SDP corresponding to the selected channel (step S1306).

Note that the processing in step S1305 and S1306 corresponds to a stream/data flow F1403 in FIG. 14.

Then, based on an IP address and a port number of an SSC recorded in the NVRAM 313, the control signal processing unit 305 accesses the SSC and acquires an SDPT (step S1307). Then, it is checked whether service identification information of the SDPT is identical to service identification information of the selected channel (step S1308). When the information is not identical (No in step 1308), the processing goes back to step S1307 and acquisition of the SDPT is repeatedly performed.

The SDPT with the identical service identification information is the SDPT of the selected channel (step S1309). Then, the control signal processing unit 305 acquires, from the acquired SDPT, stream information of the selected channel, that is, an IP address, a port number, and attribute information (codec type) of each component (such as video stream or audio stream) (step S1310).

Note that the processing in step S1307 to S1310 corresponds to a stream/data flow F1404 in FIG. 14.

The RTP/RTCP processing unit 307 is connected to a stream of each component based on the acquired stream information. Also, the NTP processing unit 308 is connected to the NTP server and performs synchronization to correct time (step S1311).

Then, the RTP/RTCP processing unit 307 performs processing of receiving a connected video stream and audio stream (step S1312). The video decoder 317 and the audio decoder 318 are synchronized with each other based on the time information acquired by the NTP processing unit 308 and respectively perform decoding of the received video stream and audio stream (step S1313). Until viewing is over (No in step S1314), reception of a stream (step S1312) and decoding processing (step S1313) are repeatedly performed.

Note that the processing in step S1311 to S1314 corresponds to signaling and a stream/data flow F1405 in FIG. 11.

According to a processing procedure illustrated in FIG. 13, an ESG can be displayed at high speed compared to a case of acquiring a bootstrap from a broadcast signal each time an ESG display is requested. Also, a URI of an SDP is described in the SDP inside the ESG. The SDP is acquired from a corresponding SDPT in a case where the SDP is referred to in the ESG. Thus, it is not necessary to perform double maintenance of the SDP and inconsistency between the SDT and the SDPT is not generated.

CITATION LIST

Patent Document

Patent Document 1: Japanese Patent Application Laid-Open No. 2010-62977
Patent Document 2: Japanese Patent Application Laid-Open No. 2012-99960

INDUSTRIAL APPLICABILITY

In the above, a technology disclosed in the present description has been described in detail with reference to a specific embodiment. However, it is obvious that those skilled in the art can perform modification or substitution of the embodiment within the spirit and the scope of the technology disclosed in the present description.

A technology disclosed in the present description can be applied, for example, to a broadcasting system which is based on a broadcasting standard ATSC employed in the US or the like. However, a range of application of the technology disclosed in the present description is not limited to this. The technology disclosed in the present description can be also applied to various broadcasting systems which are based on a different broadcasting standard employing an IP system as a transport stream or a different broadcasting standard using an ESG as a display form of a program guide or program information of television broadcasting.

That is, the technology disclosed in the present description has been described with an embodiment as an example and contents described in the present description is not to be interpreted in a limited manner. Claims are to be considered to determine the spirit of the technology disclosed in the present description.

Note that the technology disclosed in the present description can include the following configuration.

(1)
A transmission device applying an internet protocol (IP) system to a transport layer and transmitting a broadcast signal in which a table (SDPT) of a service description protocol (SDP) is arranged in a service signaling channel (SSC) transmitted in a transport stream.

(2)
The transmission device according to (1), wherein the SDPT is written in a section form and service identification information and the SDP are arranged in a header extension part thereof.

(3)
The transmission device according to (1), wherein an IP address, a port number, and attribute information of each component of a broadcasting channel corresponding to service identification information are included in the SDP arranged in the SDPT.

(4)

The transmission device according to (1), wherein a display form of a program guide or program information of a broadcast is transmitted by utilization of an electronic service guide (ESG).

(5)

The transmission device according to (4), wherein an URI of the SDP is described in the ESG and the URI of the SDP is also described in the SDPT transmitted as the SSC.

(6)

The transmission device according to (1), wherein a bootstrap of the ESG is described in signaling acquired on a reception side during initial scanning.

(7)

A transmission method including: applying an IP system to a transport layer; and transmitting a broadcast signal in which an SDPT is arranged in an SSC transmitted in a transport stream.

(8)

A reception device configured to receive a broadcast signal in which an IP system is applied to a transport layer, the reception device including: a control signal processing unit configured to process a control signal included in the broadcast signal; and a stream processing unit configured to process a stream of each component of a broadcast program, wherein the control signal processing unit performs section filtering processing with respect to a received transport stream and acquires an intended SDPT from an SSC, and the stream processing unit processes a stream of an intended channel based on an IP address and a port number described in an SDP stored in a header extension part of the acquired SDPT.

(9)

The reception device according to (8), further including a low layer control signal processing unit configured to perform processing of a low layer of the broadcast signal, and a recording unit configured to record data, wherein the low layer control signal processing unit performs initial scanning, acquires signaling including a bootstrap of an ESG, and records the signaling into the recording unit.

(10)

The reception device according to (9), further including an ESG processing unit configured to process the ESG, wherein in a case of performing a display of the ESG, the control signal processing unit acquires a bootstrap of the ESG from the signaling recorded in the recording unit, and the ESG processing unit acquires a file of the ESG based on the bootstrap.

(11)

The reception device according to (10), wherein the control signal processing unit specifies, in a case of referring to the SDP in the ESG, a corresponding SDPT from the SSC based on an URI of the SDP described in the ESG and acquires the SDP from the SDPT.

(12)

A reception method of receiving a broadcast signal in which an IP system is applied to a transport layer, including the steps of: performing section filtering processing with respect to a received transport stream and acquiring an intended SDPT from an SSC; and processing a stream of an intended channel based on an IP address and a port number described in an SDP stored in a header extension part of the acquired SDPT, the processing being performed by a stream processing unit.

(13)

A computer program described in a computer-readable form in such a manner that a computer is made to function as a reception device to receive a broadcast signal in which an IP system is applied to a transport layer, the computer program causing the computer to function as a control signal processing unit configured to process a control signal included in the broadcast signal and a stream processing unit configured to process a stream of each component of a broadcast program, wherein the control signal processing unit performs section filtering processing with respect to a received transport stream and acquires an intended SDPT from an SSC, and the stream processing unit processes a stream of an intended channel based on an IP address and a port number described in an SDP stored in a header extension part of the acquired SDPT.

REFERENCE SIGNS LIST

100 Digital broadcasting system
110 Digital television broadcasting service
120 Broadcasting service for mobile terminal
130 Television receiver
131 Recording device
140 Mobile phone
150 Streaming server
160 Application server
170 Internet
180 LAN
181 Edge router
182 ONU
301 Broadcasting tuner
302 Communication interface
303 IP layer processing unit
304 UDP layer processing unit
305 Control signal processing unit
306 FLUTE processing unit
307 RTP/RTCP processing unit
308 NTP processing unit
309 TCP layer processing unit
310 HTTP processing unit
311 CAS/DRM processing unit
312 Low layer control signal processing unit
313 NVRAM
314 External output interface
315 ESG processing unit
316 Browser
317 Video decoder
318 Audio decoder
319 Caption decoder
320 Clock processing unit
321 Storage unit

The invention claimed is:

1. A transmission device, comprising:
circuitry configured to
generate a service table including service identification information and, for each of a plurality of components of a service identified by the service identification information, IP address and port number information for processing the respective component;
generate a broadcast signal in which an Internet Protocol (IP) system is applied to a transport layer, electronic service guide (ESG) data is delivered via a first layer of a protocol stack of the IP system and the service table is delivered in a second layer of the protocol stack; and transmit the broadcast signal with low level signaling information delivered in a third layer of the protocol stack that is lower than the first layer and the second layer of the protocol stack, the low level signaling information indicating an IP address of the service table.

2. The transmission device according to claim 1, wherein the service table is written in a section form and the service identification information and the IP address and port number information are arranged in a header extension part thereof.

3. The transmission device according to claim 1, wherein an IP address, a port number, and attribute information of each component of a broadcasting channel corresponding to the service identification information are included in the service table.

4. The transmission device according to claim 1, wherein a display form of a program guide or program information of a broadcast is transmitted by utilization of an ESG of the ESG data.

5. The transmission device according to claim 4, wherein an uniform resource identifier (URI) of a service description protocol (SDP) is described in the ESG and references the SDP in the service table, the SDP including, for each of the plurality of components of the service, the IP address and port number information for processing the respective component.

6. The transmission device according to claim 1, wherein a bootstrap of the ESG data is described in signaling acquired on a reception side during initial scanning.

7. A transmission method comprising:
generating, by circuitry of a transmission device, a service table including service identification information and, for each of a plurality of components of a service identified by the service identification information, IP address and port number information for processing the respective component;
generating, by the circuitry, a broadcast signal in which an Internet Protocol (IP) system is applied to a transport layer, electronic service guide (ESG) data is delivered via a first layer of a protocol stack of the IP system and the service table is delivered in a second layer of the protocol stack; and
transmitting, by a transmitter, the broadcast signal with low level signaling information delivered in a third layer of the protocol stack that is lower than the first layer and the second layer of the protocol stack, the low level signaling information indicating an IP address of the service table.

8. A reception device, comprising:
a receiver configured to receive a broadcast signal in which an IP system is applied to a transport layer, electronic service guide (ESG) data being delivered via a first layer of a protocol stack of the IP system and a service table being delivered in a second layer of the protocol stack, the service table including service identification information and, for each of a plurality of components of a service identified by the service identification information, IP address and port number information for processing the respective component; and
processing circuitry configured to
acquire the service table from the broadcast signal based on an IP address of the service table that is indicated by low level signaling information included in the broadcast signal, the low level signaling being delivered in a third layer of the protocol stack that is lower than the first layer and the second layer of the protocol stack, and
process a stream of a channel associated with the service based on the IP address and port number information described in the service table.

9. The reception device according to claim 8, wherein the circuitry is configured to perform processing of the third layer of the broadcast signal in which the low level signaling information is delivered,
the reception device further comprises a memory, and
the circuitry is configured to
perform an initial scanning,
acquire signaling including a bootstrap of the ESG data, and
store the signaling into the memory.

10. The reception device according to claim 9, wherein the circuitry is configured to process the ESG data, and
in a case of performing a display of an ESG, the circuitry is configured to acquire the bootstrap of the ESG data from the signaling stored in the memory, and acquire the ESG data based on the bootstrap.

11. The reception device according to claim 10, wherein the circuitry is configured to specify, in a case of referring to a service description protocol (SDP) in the ESG data, the service table based on an uniform resource identifier (URI) of the SDP described in the ESG data and acquire the SDP from the service table, and
the service table includes, for each of the plurality of components of the service, the IP address and port number information for processing the respective component.

12. A reception method of receiving a broadcast signal in which an IP system is applied to a transport layer, comprising:
receiving by a receiver the broadcast signal, electronic service guide (ESG) data being delivered via a first layer of a protocol stack of the IP system and a service table being delivered in a second layer of the protocol stack, the service table including service identification information and, for each of a plurality of components of a service identified by the service identification information, IP address and port number information for processing the respective component;
acquiring, by circuitry of a reception device, the service table from the broadcast signal based on an IP address of the service table that is indicated by low level signaling information included in the broadcast signal, the low level signaling information being delivered in a third layer of the protocol stack that is lower than the first layer and the second layer of the protocol stack; and
processing a stream of a channel based on the IP address and the port number information described in the service table.

13. A non-transitory computer-readable medium storing instructions which when executed by a computer cause the computer to perform a method of receiving a broadcast signal in which an IP system is applied to a transport layer, the method comprising:
receiving the broadcast signal, electronic service guide (ESG) data being delivered via a first layer of a protocol stack of the IP system and a service table being delivered via a second layer of the protocol stack, the service table including service identification information, for each of a plurality of components of a service identified by the service identification information, IP address and port number information for processing the respective component of the service identified by the service identification information;

acquiring the service table from the broadcast signal based on an IP address of the service table that is indicated by low level signaling information included in the broadcast signal, the low level signaling information being delivered in a third layer of the protocol stack that is lower than the first layer and the second layer of the protocol stack; and processing a stream of a channel based on the IP address and the port number information described in the service table.

14. The reception device according to claim 8, wherein the circuitry is configured to:

process the stream of the channel based on codec information for each of the plurality of components of the service included in the service table in response to a channel selection via an ESG of the ESG data.

15. The reception device according to claim 14, wherein the ESG data includes an identifier of a service description in the service table that includes the codec information for each of the plurality of components of the service.

16. The reception device according to claim 15, wherein the identifier is a uniform resource identifier (URI) of the service description in the service table.

* * * * *